(12) United States Patent
Maier et al.

(10) Patent No.: US 6,787,596 B1
(45) Date of Patent: *Sep. 7, 2004

(54) SOLVENT-FREE POLYRETHANE-POLYMER-HYBRID-DISPERSION AND USE THEREOF

(75) Inventors: Alois Maier, Engelsberg (DE); Stefan Ingrisch, Seebruck (DE); Herbert Winkelmann, Garching (DE); Franz Wolfertstetter, Palling (DE); Alfred Kern, Kirchweidach (DE); Werner Temme, Bietingen (DE); Ralph Bergs, Hilzingen (DE)

(73) Assignee: SKW Bauchemie GmbH, Trostberg (DE)

( * ) Notice: Subject to any disclaimer, the term of this patent is extended or adjusted under 35 U.S.C. 154(b) by 262 days.

This patent is subject to a terminal disclaimer.

(21) Appl. No.: 10/110,446

(22) PCT Filed: Oct. 16, 2000

(86) PCT No.: PCT/EP00/10170

§ 371 (c)(1),
(2), (4) Date: Apr. 11, 2002

(87) PCT Pub. No.: WO01/29102

PCT Pub. Date: Apr. 26, 2001

(30) Foreign Application Priority Data

Oct. 16, 1999 (DE) .......................... 199 49 971

(51) Int. Cl.⁷ .............................. C08J 3/00; C08K 3/20; C08L 75/00; C08F 8/30; C08G 18/00
(52) U.S. Cl. ........................ 524/507; 524/591; 524/839; 524/840; 525/123; 525/128; 525/455
(58) Field of Search ................................. 524/507, 591, 524/839, 840; 525/123, 128, 455

(56) References Cited

U.S. PATENT DOCUMENTS 5,521,246 A 5/1996 Tien et al.
6,566,438 B1 * 5/2003 Ingrisch et al. ............. 524/507
6,635,723 B1 * 10/2003 Maier et al. ................. 525/459

FOREIGN PATENT DOCUMENTS

| DE | 38 06 066 A1 | 9/1989 |
| DE | 198 12 751 A | 10/1999 |
| EP | 0 189 945 A2 | 8/1986 |
| EP | 0 308 115 A | 3/1989 |
| EP | 0 666 275 A | 8/1995 |
| EP | 0 742 239 A | 11/1996 |

* cited by examiner

*Primary Examiner*—Patrick D. Niland
(74) *Attorney, Agent, or Firm*—Fulbright & Jaworski L.L.P.

(57) ABSTRACT

A solvent-free polyurethane-polymer hybrid dispersion having a high solids content of polymer or formulation constituents is described, which is obtainable by a) the multistage preparation of a polyurethane base dispersion and b) by the subsequent preparation of a polyurethane-polymer hybrid dispersion.

This polyurethane-polymer hybrid dispersion not only is distinguished by complete freedom from solvents and high solids contents in combination with low viscosity and a technically simple preparation process but also has excellent mechanical properties and, owing to the low hydrophilicity, high water resistance. The polyurethane-polymer hybrid dispersion proposed according to the invention can be used in an outstanding manner in formulations for sport floor coverings, said dispersion being suitable in particular as a binder for resilient coats, as a spray or leveling coating on resilient or rigid substrates, as an adhesion promoter or primer, as filling compounds for sealing pores, as adhesive for the adhesive bonding of prefabricated resilient layers or for the sealing of sport floor coverings.

60 Claims, No Drawings

SOLVENT-FREE POLYRETHANE-POLYMER-HYBRID-DISPERSION AND USE THEREOF

The present invention relates to a solvent-free polyurethane-polymer hybrid dispersion having a high solids content of polymer or formulation constituents and to its use.

The binder class consisting of the aqueous or water-based polyurethanes has been known for more than 40 years. The property profile of the water-based polyurethanes has been continuously improved in the past decades, which is impressively demonstrated by a large number of patents and publications on this topic area. There are three reasons for the fact that aqueous polyurethanes have acquired increasing commercial importance precisely in recently years:
1. The increasing stringency of the environmental legislation requires the development of ecologically and physiologically compatible products for which the emissions of solvents and other volatile organic compounds (VOC) are minimized.
2. The use of expensive organic solvents in conventional and aqueous polyurethanes is undesired for economic reasons.
3. The performance of aqueous polyurethanes reaches or surpasses that of even the conventional solvent-based polyurethanes.

Water-based polyurethanes are also becoming more and more important as binders in applications involving construction chemistry. In construction chemistry, in particular polyurethane dispersions and polyurethane-polymer hybrid dispersions having a high solids content of polyurethane polymer or formulation constituents are desired, which dispersions can be provided with the aid of efficient and at the same time universal preparation processes. Low-solvent (low VOC) or solvent-free (zero VOC) products are of primary importance.

The chemistry and technology of the water-based polyurethanes has been known for many years and is described in detail in a large number of publications, e.g. D. Dieterich, K. Uhlig in *Ullmann's Encyclopedia of Industrial Chemistry*, Sixth Edition 1999 Electronic Release. Wiley-VCH; D. Dieterich in *Houben-Weyl, Methoden der Organischen Chemie [Methods of Organic Chemistry]*, Vol. E20, H. Bartl, J. Falbe (Editors), Georg Thieme Verlag, Stuttgart 1987, page 1641 et seq.; D. Dieterich, Prog. Org. Coat. 9 (1981) 281–330; J. W. Rosthauser, K. Nachtkamp, Journal of Coated Fabrics 16 (1986) 39–79; R. Arnoldus, Surf. Coat. 3 (Waterborne Coat.) (1990), 179–98.

Aqueous polyurethane dispersions consist of polyurethane polymers or polyurethane-polyurea polymers which contain both urethane groups and urea groups and are obtainable by polyaddition reactions of polyols, polyisocyanates and polyamines. Polyurethane prepolymers are first prepared from the polyols and the polyisocyanates and are then dispersed in the aqueous phase and are subjected to chain extension with polyamines with synthesis of the polyurethane-polyurea polymers. The polyurethane polymers also contain a sufficient amount of hydrophilic groups which ensure stabilization in the aqueous phase. These hydrophilic groups are anionic, cationic or nonionic groups. The charge density of the hydrophilic groups in relation to the polyurethane polymer depends on the characteristics and on the stoichiometry of the structural components used. Polyurethane dispersions are two-phase systems which consist of micelles with polyurethane polymers and an aqueous phase. In the drying of the polyurethane dispersions, coalescence or fusion of the micelles and film formation of the polyurethane polymers take place.

The prepolymer mixing process and the solvent process have become most important for the preparation of polyurethane dispersions in industry.

However, these conventional processes for the preparation of polyurethane dispersions are associated with various problems.

In the prepolymer mixing process, significant amounts of high-boiling and water-soluble solvents, such as, for example, N-methylpyrrolidone, are added in order to reduce the viscosity of the polyurethane prepolymers. These solvents remain in the polyurethane dispersion after the preparation. During drying of the polyurethane dispersions or of the products prepared therefrom, these solvents are released into the environment. In addition to the solvent content present, the low solids contents, the generally moderate material properties and the large amounts of the hydrophilic groups required for stabilizing the polyurethane dispersions are disadvantageous. However, the prepolymer mixing process is a simple and efficient preparation process having a large synthetic range, which is very advantageous in many cases.

In the solvent process or acetone process, the complete synthesis of the polyurethane polymers is carried out in the presence of large amounts of low-boiling and water-soluble solvents, such as, for example, acetone or methyl ethyl ketone. After the preparation of the polyurethane dispersion, the solvents have to be removed again by a complicated redistillation, and the resulting polyurethane dispersions are therefore substantially solvent-free. In addition to the freedom from solvent, the high solids contents, the excellent material properties and the small amounts of the hydrophilic groups required for stabilizing the polyurethane dispersions are advantageous. However, the solvent process is a complicated and economically nonoptimal preparation process having a low space/time yield, which is very disadvantageous particularly with regard to applications involving construction chemistry.

There are also various combinations of prepolymer, mixing process and solvent process, which however have similar problems. Thus, a mixture of low-boiling and high-boiling solvents can be used in the polymer mixing process or the complete synthesis of the polyurethane dispersion can be transferred to the aqueous phase in the solvent process.

Recently, efforts have increasingly been made by the producers of polyurethane dispersions to replace solvents such as N-methylpyrrolidone by ecologically safe glycol ethers, such as, for example, dipropylene glycol dimethyl ether (Proglyde DMM® from Dow), which are not subject to labeling requirements. However, such a changeover leads to an increase in the costs of the prepolymer mixing process.

Polyurethane dispersions and acrylate dispersions are widely used in finishes and coatings, but both binder types have specific advantages and disadvantages. Acrylate dispersions generally have only a moderate property profile but are economical. Polyurethane dispersions on the other hand have excellent performance in combination with significantly higher costs. Simple blends of polyurethane dispersions and acrylate dispersions are therefore frequently used as price/performance compromise, but the material properties of these blends are usually poorer than would be expected from the known "mixing rules".

In order to achieve a true price/performance advantage, aqueous polyurethane-acrylate hybrid dispersions have therefore increasingly been developed in recent years. The preparation of these polyurethane-polymer hybrid dispersions is carried out by an in situ polymerization. There, the monomers are subjected to a free radical polymerization in the presence of polyurethane base dispersions and suitable initiator systems. Micellar structures which, at the molecular level, consist of physically linked polyurethane chains and polymer chains are present in the resulting hybrid systems. The glass transition temperature, which extends over wide ranges (>50° C.), can be used as an indicator for the formation of these interpenetrating networks. Without corresponding modification of the polyurethane dispersions, there is no additional chemical linkage between the polyurethane chains and polymer chains. The cohesion of the macromolecules is due firstly to the mutual entanglement of the polyurethane chains and polymer chains and secondly to intermolecular interaction forces. However, it is not possible to rule out the fact that grafting of polymer chains onto polyurethane chains takes place to a small extent, which leads to an increase in the stability of the hybrid system. Owing to their particular morphology, polyurethane-polymer hybrid dispersions have better material properties than comparable blends of polyurethane dispersions and acrylate dispersions or hypothetical blends according to the "mixing rule".

For the preparation of polyurethane-polymer hybrid dispersions, the process frequently referred to in the literature (incorrectly) as in situ polymerization is usually used in its variants in industry.

Variant 1

1A: All monomers are introduced as reactive diluents into the polyurethane prepolymer before the D, N and CE 1B: All monomers are initially introduced in the dispersing medium before the D, N and CE of the polyurethane polymer 1C: The monomers are completely introduced into the polyurethane base dispersion after the D, N and CE of the polyurethane prepolymer 1D: The monomers are introduced continuously into the polyurethane base dispersion after the D, N and CE of the polyurethane prepolymer Variant 2

2A: A part of the monomers is introduced as reactive diluent into the polyurethane prepolymer before the D, N and CE 2B: A part/the remainder of the monomers is initially introduced in the dispersing medium before the D, N and CE of the polyurethane prepolymer 2C: A part/the remainder of the monomers is completely introduced into the polyurethane base dispersion after the D, N and CE of the polyurethane prepolymer 2D: A part/the remainder of the monomers is introduced continuously into the polyurethane base dispersion after the D, N and CE of the polyurethane prepolymer (D=dispersing, N=neutralization, CE=chain extension)

The initiator can be added together with the monomers or separately. Usually, the initiator is added after the dispersion of the polyurethane prepolymer. The free radical polymerization can be effected in principle during or after the chain extension or partly before and partly after the chain extension. Usually, the free radical polymerization is carried out after the chain extension. The term batch process is used in the case of the variants 1A to 1C, the term seed-feed process is used in the case of the variant 1D, and a combined process is present in the case of the variants 2A to 2D.

The use of reactive diluents according to variants 1A and 2A is not without problems since hydrophilic cosolvents and/or dispersing additives or surfactants frequently have to be used for complete emulsification of the hydrophobic monomers in the aqueous medium. The solids contents of the hybrid systems are therefore inevitably low. In addition, a conventional emulsion polymerization of the monomers is initiated as a secondary reaction by the presence of the dispersing additives or surfactants, in addition to the hybridization, leading to a deterioration in the material properties. Since the reactive diluents are exposed to the reaction conditions of the polyurethane prepolymer synthesis at least briefly, additional inhibition of the monomers is frequently required, which may have to be compensated in the subsequent free radical polymerization by an increased amount of initiator.

For initially introducing the monomers in the, dispersing medium according to variants 1B and 2B, dispersing additives or surfactants are likewise required in order to be able at all to achieve homogenization of the polyurethane prepolymer and monomers at the molecular level during the dispersing. Accordingly, secondary reactions may take place here too.

In the seed-feed process according to variants 1D and 2D, monomers and initiator are metered (semi)continuously into the polyurethane base dispersion heated to the decomposition temperature range of the initiator. The monomers may polymerize in an aqueous medium even before the emulsification through the polyurethane base dispersion, which can lead to more or less pronounced coagulum formation. If a hydrophilic or water-soluble initiator is also present, conventional emulsion polymerization of the monomers takes place in turn as a secondary reaction.

Variant 1A

U.S. Pat. No. 5,371,133 describes a process for the preparation of polyurethane/acrylate or polyurethane/vinyl latices, in which the polyurethane polymer has no urea groups at all. A polyurethane resin nonionically hydrophilized with polyethylene glycol is allowed to react to completion in the presence of acrylate or vinyl monomers as solvent or reactive diluent. After transfer into the aqueous phase and addition of free radical initiators, a free radical polymerization is initiated. The process described has a number of serious disadvantages. Large amounts of monomers are required for dissolving the high molecular weight polyurethane resin (NCO/OH equivalent ratio=1/1), and additional surfactants are required for dispersing. In the free radical polymerization, hydrophilic free radical initiators and further hydrophilic monomers are added, which, in combination with surfactants, are expected to permit the formation of considerable amounts of conventional acrylate- or vinyl-based emulsion polymers as byproducts. The viscosity-reducing effect of the reactive diluents explains the discrepancy between the described hybrid systems having a solids content of from 40 to 50% by weight and a viscosity of from 1000 to 5000 mPa.s and a pure polyurethane dispersion having a solids content of only 33% by weight and a viscosity of 27000 mPa.s, which is likewise described.

Variant 1C

EP-A 666 275 describes a process for the preparation of solvent-free polyurethane/acrylate polymer dispersions for use as laminating adhesives for flexible packaging materials. Although no organic solvents are used for the preparation of the polyurethane prepolymers based on polyesterpolyol, dimethylolpropionic acid and isophorone diisocyanate, the same amount of acrylate monomer has to be used as reactive diluent for reducing the high viscosity. Owing to the low NCO/OH equivalent ratio of 1.20, the resulting polyurethane prepolymers have only a very low content of free isocyanate groups (1.43% by weight). After the neutralization and dispersing, the free radical initiator is added in acetone as a solvent. This is followed by reaction with a chain stopper and a chain extender, the weight ratio of which is adjusted to 20:80 to 80:20. The chain stopper used is a monoamine and the chain extender used is a diamine. Finally, a free radical polymerization is initiated by increasing the temperature. The hybrid systems thus prepared have a solids content of only from 41 to 42% by weight. The polyurethane base dispersions used have average molar masses of less than 25000 Dalton.

Variants 1C and 2A, 2C and 2D

WO 99/16805 describes aqueous polymer dispersions which consist of a polyurethane polymer dispersed in water and a vinyl polymer and are used for coating wood and board. The polyurethane component consists of polyalkylene glycols or polyesterpolyols, dimethylolpropionic acid and aliphatic polyisocyanates; the acrylate component is composed of acrylates, methacrylates and styrene. Both the polyurethane base dispersion and the polyurethane-polymer hybrid dispersion have very low solids contents and additionally contain N-methylpyrrolidone as a solvent. Owing to the low polyurethane/acrylate ratio, large amounts of acid groups have to be incorporated as early as the polyurethane prepolymer synthesis stage, in order to be able to ensure stabilization of the monomers or polyurethane-polymer hybrid dispersion (acid number $\geq 44$ mg $KOH.g^{-1}$, >10.5% by weight of DMPA). The process used for the hybridization is expensive and complicated, and the polymerization is effected using a three-stage process ("triple batch method").

Variants 1C and 2C and 2D

EP-A 309 114 discloses aqueous dispersions of vinyl polymers and nonionic water-dispersible polyurethanes having polyethylene oxide side chains. The polyurethane dispersions on which these hybrid systems are based are insensitive to acid groups and are based on polyalkylene glycols, aliphatic and/or aromatic polyisocyanates and dispersing diols based on MPEG 750 and, in the subsequent polymerization, permit the use of acrylic acid or methacrylic acid as comonomers. The solids contents of the polyurethane-polymer hybrid dispersions are at a very low level, and the synthesis of the nonionically modified polyurethane base dispersions requires large amounts of organic solvents. EP-A 297 576 discloses a method for manufacturing a multilayer coating and an aqueous coating material suitable for this purpose. The polyurethane base dispersions described are based on polyesterpolyols and are prepared with the aid of the solvent process. In addition to acetone, N-methylpyrrolidone is also used as solvent and remains in solution. Monomers used are (meth)acrylates and hydroxyalkyl (meth)acrylates and the initiator used is 2,2'-azobisisobutyronitrile. As a result of the preparation process, the polyurethane-polymer hybrid can be prepared with a relatively low acid number (from 12 to 40 mg $KOH.g^{-1}$). The solids contents of the hybrid systems are in the range of only from 32 to 35% by weight.

It is furthermore known that terminal or lateral $\alpha,\beta$-olefinically unsaturated double bonds can be incorporated into the initially prepared polyurethane resin. These polyurethane macromonomers are said to have the advantage of better chemical binding to the polymer resin prepared by free radical polymerization. Additional chemical crosslinking can be achieved by modifying the polyurethane polymers with double bonds capable of free radical polymerization, for example by terminal incorporation of hydroxyalkyl (meth)acrylates or $\alpha,\alpha$-dimethyl-3-isopropenylbenzyl isocyanate (m-TMI) or by lateral incorporation of maleic acid or itaconic acid within polyesterpolyols, but is complicated and does not significantly improve the material properties of the polyurethane-polymer hybrid dispersion. It is stated as early as DE-A-19 53 348 that more or less pronounced grafting occurs in the free radical polymerization even without the incorporation of unsaturated groups into the polyurethane polymer and that the high crosslinking density which results from the use of unsaturated polyurethane polymers may sometimes be disadvantageous.

According to the prior art, liquid polyurethane plastics are usually used for the production of light athletics tracks, school sports facilities, multipurpose sport floor coverings, tennis or ball game facilities, resilient layers under artificial turf, playgrounds, paths, small play areas, sport halls, light athletics halls and multipurpose sport halls. Depending on requirements, water-permeable or water-impermeable floor coverings can be constructed.

Polyurethane-based sport floor coverings for outdoors and indoors can be produced on various substrates, such as asphalt, cement-bound substrates, wood and wood floor toppings. These are specifically floor covering structures consisting of polyurethane prepolymers having free isocyanate groups, which either undergo moisture-curing as a one-component formulation or cure as a two-component formulation in a defined mixing ratio, based on polyol and/or amine.

These are specifically the products which are described in more detail below and are used in the formulations for sport floor coverings:

1) Binders for resilient layers
2) Adhesion promoters and primers
3) Spray coatings
4) Leveling coatings
5) Filling compounds
6) Adhesives
7) Seals The disadvantage of all these polyurethane-based formulations is the fact that these products are isocyanate-containing and in some cases contain large amounts of solvent, so that these components give rise to considerable danger potential for humans and the environment, necessitating particular environmental protection and safety measures during their processing. In addition, these isocyanate-containing formulations cure extremely slowly at low temperature and often achieve only a reduced property level owing to the secondary reaction with atmospheric humidity.

It was therefore the object of the present invention to develop a solvent-free polyurethane-polymer hybrid dispersion which has a high solids content of polymer or formulation constituents and does not have the stated disadvantages of the prior art but has good performance characteristics and at the same time can be prepared taking into account ecological, economic and physiological aspects.

This object was achieved, according to the invention, by providing a solvent-free polyurethane-polyurethane-polymer dispersion, which is obtainable by first a) preparing a polyurethane base dispersion, by $a_1$) reacting from 2 to 40% by weight of a relatively high molecular weight polyol component (A) (i) having two or more hydroxyl groups reactive toward polyisocyanates and a molecular mass of from 500 to 6000 Dalton and, if required, from 0.1 to 2% by weight of low molecular weight polyol component (A) (ii) having two or more hydroxyl groups reactive toward polyisocyanates and a molecular mass of from 60 to 150 Dalton with from 2 to 20% by weight of a polyisocyanate component (B) consisting of at least one polyisocyanate, polyisocyanate derivative or polyisocyanate homolog having two or more aliphatic or aromatic isocyanate groups, if required in the presence of a catalyst, $a_2$) reacting the polyurethane preadduct from stage $a_1$), which has completely or partly reacted, with from 0.1 to 2% by weight of a low molecular weight and anionically modifiable polyol component (A) (iii) having two or more hydroxyl groups reactive toward polyisocyanates and one or more carboxyl groups inert toward polyisocyanates and a molecular mass of from 50 to 250 Dalton, which can be completely or partly converted into carboxylate groups in the presence of bases, $a_3$) reacting the polyurethane prepolymer from stage $a_2$) with from 0.1 to 1.5% by weight of a neutralizing component (C) for complete or partial neutralization of the carboxyl groups, subsequently or simultaneously $a_4$) dispersing the neutralized polyurethane prepolymer from stage $a_3$) in from 10 to 60% by weight of water which, if required, also contains from 0.1 to 70% by weight of a formulation component (E) consisting of fillers, pigments, plasticizers, fiber materials and/or other conventional additives for in situ formulation, and then $a_5$) reacting the polyurethane prepolymer dispersion from stage $a_4$) with from 0.1 to 2% by weight of a chain-extending component (D) consisting of at least one polyamine having one or more amino groups reactive toward polyisocyanates and, if required, from 0.05 to 1% by weight of a chain stopper component (E) consisting of at least one monoamine having an amino group reactive toward polyisocyanates, and b) by the subsequent preparation of a polyurethane-polymer hybrid dispersion by $b_1$) mixing the polyurethane base dispersion from stage $a_5$) with a prepared mixture of from 3 to 60% by weight of a monomer component (G) consisting of one or more monomers having one or more double bonds capable of free radical polymerization and from 0.01 to 1% by weight of initiator component (H) consisting of at least one lipophilic free radical initiator which has a half-life of one hour at a decomposition temperature in the range of from 40 to 120° C., and finally $b_2$) carrying out a free radical polymerization of the component (G) within the micelles of the polyurethane base dispersion by the thermal decomposition of the component (H).

It has in fact surprisingly been found that these polyurethane-polymer hybrid dispersions not only are distinguished by complete freedom from solvent, high solids contents in combination with low viscosity and a technically simple preparation process but also have excellent mechanical properties (e.g. elongation and tensile strength) and, owing to the low hydrophilicity, high water resistance.

In addition, high filler contents can be achieved in the presence of formulation components, which was also not foreseeable.

The polyurethane-polymer hybrid dispersion according to the invention is defined by its multistage preparation process. A polyurethane base dispersion is first prepared in reaction stage a) and is then further reacted in reaction stage b) to give a polyurethane-polymer hybrid dispersion.

In order to carry out this process, from 2 to 40% by weight of a polyol component (A) (i) and, if required, from 0.1 to 2% by weight of a polyol component (A) (ii) are reacted with from 2 to 20% by weight of a polyisocyanate component (B), if required in the presence of a catalyst, in reaction stage $a_1$) to give a polyurethane preadduct, using the techniques customary in polyurethane chemistry.

The formation of the polyurethane preadduct in reaction stage $a_1$) is effected preferably by adding or metering the component (B) within a period of from a few minutes to a few hours to the mixture of the components (A) (i) and, if required, (A) (ii) or alternatively adding or metering the mixture of the component (A) (i) and, if required, (A) (ii) within a period of a few minutes to a few hours to the component (B).

In reaction stage $a_1$), the NCO/OH equivalent ratio of the components (A) (i), (A) (ii) and (B) is preferably adjusted to a value of from 2.5 to 5.0.

The polyol component (A) (i) consists of at least one relatively high molecular weight polyol having two or more hydroxyl groups reactive toward polyisocyanates and an average molecular mass (number average $M_n$) of from 500 to 6000 Dalton, in particular based on the polyetherpolyol and/or polyesterpolyol. These are preferably polymeric polyols, such as polyalkylene glycols, aliphatic or aromatic polyesters, polycaprolactones, polycarbonates, macromonomers, telechelic substances or epoxy resins or mixtures thereof. Polyalkylene glycols are obtained from monomers such as ethylene oxide, propylene oxide, butylene oxide or tetrahydrofuran by polymerization in the presence of boron trifluoride or by polyaddition with initiator compounds having reactive hydrogen atoms, such as water, alcohols, amines or bisphenol A. Mixtures of the monomers may also be used simultaneously or in succession. For example, polyethylene glycols, polypropylene glycols (e.g. Voranol® grades from Dow, Acclaim® grades from Arco Chemical), mixed polyglycols based on ethylene oxide and propylene oxide, and polytetramethylene glycols and polytetrahydrofurans (e.g. PolyTHF 2000 from BASF) can be used as suitable polyalkylene glycols. Linear or difunctional polypropylene glycols having an average molecular mass (number average $M_n$) of from 1000 to 4000 Dalton are preferably used. Aliphatic or aromatic polyesterpolyols are obtained by polycondensation reaction and/or polyaddition reaction from dihydric or polyhydric alcohols and dibasic or polybasic carboxylic acids, carboxylic anhydrides or carboxylic esters. For example, condensates based on 1,2-ethanediol or ethylene glycol, 1,4-butanediol or 1,4-butylene glycol, 1,6-hexanediol or 1,6-hexamethylene glycol and 2,2-dimethyl-1,3-propanediol or neopentyl glycol and 1,6-hexanedioic acid or adipic acid and 1,3-benzenedicarboxylic acid or isophthalic acid (e.g. Bester grades from Poliolchemica) can be used as suitable aliphatic or aromatic polyesters. Linear or difunctional aliphatic or aromatic polyesterpolyols having an average molecular mass (number average $M_n$) of from 1000 to 4000 Dalton are preferred. Polycaprolactones (e.g. Capa grades from Solvay Interox) and polycarbonates (e.g. Desmophen C 200 from Bayer) likewise belong to the polyester group. The former are obtained by reacting phosgene or aliphatic or aromatic carbonates, such as, for example, diphenyl carbonate or diethyl carbonate, with dihydric or polyhydric alcohols. The latter are prepared by polyaddition of lactones, such as, for example, ε-caprolactone, with initiator compounds having reactive hydrogen atoms, such as water, alcohols, amines or bisphenol A. Synthetic combinations of polyesters, polycaprolactones and polycarbonates are also possible. Macromonomers, telechelic substances or epoxy resins are likewise suitable. The macromonomers and telechelic substances are polyhydroxy olefins, such as, for example, α,ω-dihydroxypolybutadienes, α,β-dihydroxypoly(meth)acrylates, α,ω-dihydroxypoly(meth)acrylates (e.g. TEGO® Diol BD 1000, TEGO® Diol MD 1000 N, from Th.Goldschmidt AG) or α,ω-dihydroxypolysiloxanes. The epoxy resins are preferably polyhydroxy-functional derivatives of bisphenol A diglycidyl ether (BADGE).

The component (A) (ii) consists of at least one low molecular weight polyol having two or more hydroxyl groups reactive toward polyisocyanates and a molecular mass of from 60 to 150 Dalton. For example, 1,2-ethanediol or ethylene glycol, 1,2-propanediol or 1,2-propylene glycol, 1,3-propanediol or 1,3-propylene glycol, 1,4-butanediol or 1,4-butylene glycol, 1,6-hexanediol or 1,6-hexamethylene glycol, 2-methyl-1,3-propanediol (trade name MPDiol Glyco® from Arco Chemical), 2,2-dimethyl-1,3-propanediol or neopentyl glycol, 1,4-bis(hydroxymethyl)cyclohexane or cyclohexanedimethanol, 1,2,3-propanetriol or glycerol, 2-hydroxymethyl-2-methyl-1,3-propanol or trimethylolethane, 2-ethyl-2-hydroxymethyl-1,3-propanediol or trimethylolpropane, 2,2-bis(hydroxymethyl)-1,3-propanediol or pentaerythritol can be used as suitable low molecular weight polyols.

The polyisocyanate component (B) consists of at least one polyisocyanate, polyisocyanate derivative or polyisocyanate homolog having two or more aliphatic or aromatic isocyanate groups. In particular, the polyisocyanates sufficiently well known in polyurethane chemistry or combinations thereof are suitable. For example, 1,6-diisocyanatohexane (HDI), 1-isocyanato-5-isocyanatomethyl-3,3,5-trimethylcyclohexane or isophorone diisocyanate (IPDI), bis(4-isocyanatocyclohexyl)methane ($H_{12}$MDI), 1,3-bis(1-isocyanato-1-methylethyl)benzene (m-TMXDI) or industrial isomer mixtures of the individual aromatic polyisocyanates can be used as suitable aliphatic polyisocyanates. For example, 2,4-diisocyanatotoluene or toluene diisocyanate (TDI), bis(4-isocyanatophenyl)methane (MDI) or, if required, its higher homologs (polymeric MDI) or industrial isomer mixtures of the individual aromatic polyisocyanates can be used as suitable aromatic polyisocyanates. The so-called "coating polyisocyanates" based on bis(4-isocyanatocyclohexyl)methane ($H_{12}$MDI), 1,6-diisocyanatohexane (HDI), 1-isocyanato-5-isocyanatomethyl-3,3,5-trimethylcyclohexane (IPDI) are in principle also suitable. The term "coating polyisocyanates" denotes those derivatives of these diisocyanates which have allophanate, biuret, carbodiimide, isocyanurate, uretdione or urethane groups and in which the residual content of monomeric diisocyanates was reduced to a minimum in accordance with the prior art. Modified polyisocyanates which are obtainable, for example, by hydrophilic modification of "coating polyisocyanates" based on 1,6-diisocyanatohexane (HDI) can also be used. The aliphatic polyisocyanates are preferable to the aromatic polyisocyanates. Furthermore, polyisocyanates having isocyanate groups of different reactivities are preferred.

In the subsequent reaction stage $a_2$), the reaction of the completely or partly reacted polyurethane preadduct from stage $a_1$) with from 0.1 to 2% by weight of the component (A) (iii) to give the corresponding polyurethane prepolymer is carried out, the preferably finely milled polyol component (A) (iii) having a mean particle size of <150 μm being added or metered within a period of from a few minutes to a few hours to the polyurethane preadduct from stage $a_1$).

The component (A) (iii) consists of at least one low molecular weight and anionically modified polyol having two or more hydroxyl groups reactive toward polyisocyanates and one or more carboxyl groups which are inert to polyisocyanates and can be completely or partially converted into carboxylate groups in the presence of bases. For example, 2-hydroxymethyl-3-hydroxypropanoic acid or dimethylolacetic acid, 2-hydroxymethyl-2-methyl-3-hydroxypropanoic acid or dimethylolpropionic acid, 2-hydroxymethyl-2-ethyl-3-hydroxypropanoic acid or dimethylbutyric acid, 2-hydroxymethyl-2-propyl-3-hydroxypropanoic acid or dimethylolvaleric acid, citric acid or tartaric acid can be used as low molecular weight and anionically modifiable polyols. Bishydroxyalkanecarboxylic acids having a molecular mass of from 100 to 200 Dalton are preferably used, and preferably 2-hydroxymethyl-2-methyl-3-hydroxypropanoic acid or dimethylolpropionic acid (trade name DMPAP from Mallinckrodt).

In reaction stage $a_2$), the NCO/OR equivalent ratio of the polyurethane preadduct from stage $a_1$) and of the component (B) is preferably adjusted to a value of from 2.5 to 5.0.

The procedure of the reaction stages $a_1$) and $a_2$) is relatively noncritical with regard to the reaction conditions. Utilizing the exothermic character of the polyaddition reaction, the reaction batch in the reaction stages $a_1$) and $a_2$) is stirred under an inert gas atmosphere, preferably at from 60 to 120° C., but in particular at from 80 to 100° C., until the calculated or theoretical NCO content is reached. The required reaction times are in the region of a few hours and are influenced by reaction parameters such as the reactivity of the components, the stoichiometry of the components and the temperature. The polyurethane preadduct from stage $a_1$) which is used in reaction stage $a_2$) may also have free hydroxyl groups in addition to isocyanate groups with a corresponding procedure or incomplete reaction.

The reaction of the components (A) and (B) in the reaction stage $a_1$) and/or $a_2$) can be effected in the presence of a catalyst customary for polyaddition reactions with polyisocyanates. If required, these catalysts are added in amounts of from 0.01 to 1% by weight, based on the components (A) and (B). Customary catalysts for polyaddition reactions with polyisocyanates are, for example, dibutyltin oxide, dibutyltin dilaurate (DBTL), triethylamine, tin(II) octanoate, 1,4-diazabicyclo[2.2.2]octane (DABCO), 1,4-diazabicyclo[3.2.0]-5-nonene (DBN) and 1,5-diazabicyclo[5.4.0]-7-undecene (DBU).

The polyurethane prepolymer of the components (A) and (B) has a preferred acid number of from 2.5 to 25 meq $KOH.g^{-1}$.

The preferred NCO/OH equivalent ratio of the total amount of the components (A) (polyols) and (B) polyisocyanates) is adjusted to a value of from 1.5 to 2.5, but in particular from 1.8 to 2.2.

Polyisocyanates having isocyanate groups of different reactivities are preferably used in order to obtain narrower molecular mass distributions with lower nonuniformity. Accordingly, polyurethane prepolymers which have a linear structure and are composed of difunctional polyol components and polyisocyanate components are preferred.

The viscosity of the polyurethane prepolymers is relatively low and substantially independent of the structure of the polyol components and polyisocyanate components used. An addition of solvents for reducing the viscosity or for improving the dispersing properties of the polyurethane prepolymers is therefore not necessary. The particular structure of the prepolymers permits the preparation of products having extremely high solids contents. In addition, owing to the uniform distribution of the carboxyl or carboxylate groups over the polyurethane polymer, only low charge densities are required for stabilizing the corresponding polyurethane base dispersions.

The polyurethane prepolymer from stage $a_2$) is reacted in the subsequent reaction stage $a_3$) with from 0.1 to 1.5% by weight of a neutralizing component (C) for complete or partial neutralization of the carboxyl groups (direct neutralization).

The neutralizing component (C) consists of one or more bases which serve for complete or partial neutralization of the carboxyl groups. Tertiary amines, such as N,N-dimethylethanolamine, N-methyl-diethanolamine, triethanolamine, N,N-dimethyl-isopropanolamine, N-methyldiisopropanolamine, triisopropylamine, N-methylmorpholine, N-ethylmorpholine, triethylamine or ammonia, or alkali metal hydroxides, such as lithium hydroxide, sodium hydroxide or potassium hydroxide can be used as suitable bases. Tertiary amines and in particular triethylamine are preferably used.

The neutralizing component (C) is preferably present in an amount such that the degree of neutralization is from 70 to 100 equivalent %, preferably from 80 to 90 equivalent %, based on the free carboxyl groups of the polyurethane prepolymer. In the neutralization, carboxylate groups are formed from the carboxyl groups and serve for the anionic modification or stabilization of the polyurethane dispersion. The reaction stage $a_3$) is preferably carried out at a temperature of from 40 to 60° C., in particular at about 50° C.

The neutralized polyurethane prepolymer from stage $a_3$) is dispersed, in the subsequent reaction stage $a_4$), in from 10 to 60% by weight of water which, for in situ formulation, may also contain from 0.1 to 70% by weight of a formulation component (F) consisting of, for example, fillers, pigments, plasticizers, fiber materials and/or other conventional additives, such as, for example, dispersants, rheology auxiliaries, antifoams, adhesion promoters, antifreezes, flameproofing agents, antioxidants, UV stabilizers, bactericides, fungicides, preservatives or further polymers or polymer dispersions and redispersible polymer powders.

The formulation component (F) can be completely or partly stirred into the polyurethane prepolymer before the dispersing according to reaction stage $a_4$), if the preparation process is not adversely affected thereby.

Alternatively, in the case of conventional formulation, the formulation component (F) can be completely or partly introduced into the prepared polyurethane-polymer hybrid dispersion only after the end of the reaction stage $b_2$).

The hardness of the water used is unimportant for the process and it is therefore not necessary to use distilled, deionized or demineralized water. High hardnesses result in a further reduction in the water absorption of the polyurethane base dispersions and of the polyurethane-polymer hybrid dispersions without adversely affecting their material properties.

During the dispersing, the neutralized polyurethane prepolymer is transferred into the dispersing medium and forms a polyurethane prepolymer dispersion. The neutralized polyurethane prepolymer forms micelles which have stabilizing carboxylate groups on the surface and reactive isocyanate groups in the interior. All cationic counter ions to the anionic carboxylate groups are dissolved in the dispersing medium. The terms "dispersing" and "dispersion" include the meaning that solvated and/or suspended components may also be contained in addition to dispersed components having a micellar structure. For transfer of the polyurethane prepolymer into the aqueous phase, either the polyurethane prepolymer can be stirred into the dispersing medium or the dispersing medium can be stirred into the polyurethane prepolymer (inverse process). The reaction stage $a_4$) is preferably carried out at a temperature of from 30 to 50° C., in particular at about 40° C.

As an alternative to the procedure described, the stages $a_3$) and $a_4$) can be combined in a manner such that the neutralizing component (C) is added to the water in which the unneutralized polyurethane prepolymer according to reaction stage $a_4$) is dispersed (indirect neutralization).

The polyurethane prepolymer dispersion from stage $a_4$) is reacted, in the subsequent reaction stage $a_5$), with from 0.1 to 2% by weight of a chain-extending component (D) and, if required, with from 0.05 to 1% by weight of a chain stopper component (E). The proportion of the chain stopper component (E) is preferably less than 20% by weight, in particular less than 10% by weight, based on the total amount of the components (D) and (E). The reaction stage $a_4$) is carried out at a preferred temperature of from 30 to 50° C., in particular at about 40° C.

The chain-extending component (D) consists of at least one polyamine having two or more amino groups reactive toward polyisocyanates. Suitable polyamines are, for example, adipic acid dihydrazide, ethylenediamine, diethylenetriamine, triethylenetetramine, tetraethylenepentamine, pentaethylenehexamine, dipropylenetriamine, hexamethylenediamine, hydrazine, isophorone-diamine, N-(2-aminoethyl)-2-aminoethanol, adducts of salts of 2-acrylamido-2-methylpropane-1-sulfonic acid (AMPS) and ethylenediamine, adducts of salts of (meth)acrylic acid and ethylenediamine or any desired combination of these polyamines. Difunctional primary amines and in particular ethylenediamine are preferably used.

The chain stopper component (E) consists of at least one monoamine having an amino group reactive toward polyisocyanates. Suitable monoamines are, for example, ethylamine, diethylamine, n-propylamine, di-n-propylamine, isopropylamine, diisopropylamine, n-butylamine, di-n-butylamine, ethanolamine, diethanolamine, isopropanolamine, diisopropanolamine, morpholine, piperidine, pyrrolidine or any desired combination of these polyamines. Monofunctional primary amines and in particular isopropylamine are preferably used.

According to a preferred embodiment, the chain-extending component (D) is used in an amount such that the degree of chain extension is from 50 to 100 equivalent %, preferably from 70 to 80 equivalent %, based on the free isocyanate groups of the polyurethane prepolymer. The chain stopper component (E) is used, if required, in an amount such that the degree of chain stopping is from 1 to 20 equivalent %, preferably from 5 to 10 equivalent %, based on the free isocyanate groups of the polyurethane prepolymer. When the chain-extending component (D) and the chain stopper component (E) are used, the components can be added to the polyurethane prepolymer dispersion from stage $a_4$) either in succession or simultaneously or as a mixture. The chain-extending component (D) and the chain stopper component (E) can be diluted in the weight ratio of from 1:1 to 1:10 in amounts of water removed beforehand, in order to suppress the additional exothermicity by the hydration of the amines.

The chain extension of the polyurethane prepolymer dispersion leads to an increase in the molecular mass within the micelles and to the formation of a polyurethane-polyurea dispersion of high molecular mass. The chain-extending component (D) reacts with reactive isocyanate groups substantially more rapidly than water. The chain stopping of the polyurethane prepolymer dispersion stops the increase in the molecular mass within the micelles and leads to the formation of a polyurethane-polyurea dispersion having a lower molecular mass. The chain stopper component (E) reacts with reactive isocyanate groups substantially more rapidly than water. After the reaction stage $a_5$), any free isocyanate groups still present are all subjected to a chain-extension with water.

The solids content of polyurethane prepolymer consisting of the components (A) to (E) is adjusted in particular to from 40 to 70% by weight, preferably from 50 to 60% by weight, based on the total amount of the pure polyurethane base dispersion. The solids content of polyurethane polymer consisting of the components (A) to (E) is adjusted in particular to from 10 to 50% by weight, preferably from 20 to 40% by weight, and the solids content of formulation component (F) is adjusted in particular to from 10 to 70% by weight, preferably from 20 to 60% by weight, based on the total amount of the polyurethane base dispersion formulated in situ or conventionally.

The content of carboxylate groups in the polyurethane polymer comprising the components (A) to (E) is adjusted in particular to from 10 to 40 meq.(100 g)$^{-1}$, preferably from 15 to 35 meq.(100 g)$^{-1}$. The polyurethane polymer comprising the components (A) to (E) has a preferred acid number of of from 5 to 25 meq KOH.g$^{-1}$, in particular from 7.5 to 22.5 meq KOH.g$^{-1}$.

The polyurethane polymer has, as a rule, an average molecular mass of from 25000 to 250000 Dalton. The corresponding data relate to the number average $M_n$ and measurements with the aid of gel permeation chromatography (GPC).

The mean particle size of the micelles of the polyurethane polymer is in particular from 100 to 500 nm, preferably from 200 to 400 nm. The corresponding data relate to measurements with the aid of photon correlation spectroscopy (PCS).

The Brookfield viscosity of the polyurethane base dispersion is preferably less than 300 mPa.s, in particular less than 150 mPa.s (LV, 20° C., spindle 1, 60 rpm).

For carrying out this process further, a prepared mixture of from 3 to 60% by weight of the monomer component (G) and from 0.01 to 1% by weight of the initiator component (H) is added to the polyurethane base dispersion from stage $a_5$) in the reaction stage $b_1$) using the techniques customary in polymerizations. The molar initiator/monomer ratio of the components (H) and (G) is preferably adjusted in the range from 0.001 to 0.05. The reaction stage $b_1$) is preferably carried out at a temperature of from 15 to 35° C., in particular at from 20 to 30° C. According to a preferred embodiment, a part of the water from stage $a_4$) is added only in stage $b_1$) for adjusting the solids content.

The monomer component (F) consists of one or more monomers having one or more double bonds capable of free radical polymerization.

Suitable monomers are, for example, acrylic acid and its derivatives, such as acrylamide, N,N-dimethylacrylamide, acrylonitrile, methyl acrylate, ethyl acrylate, vinyl acrylate, propyl acrylate, isopropyl acrylate, butyl acrylate, isobutyl acrylate, tert-butyl acrylate, hexyl acrylate, cyclohexyl acrylate, octyl acrylate, 2-ethylhexyl acrylate, 3,3,5-trimethylhexyl acrylate, dodecyl acrylate, isododecyl acrylate, octadecyl acrylate and 2-hydroxyethyl acrylate, hydroxypropyl acrylate (isomer mixture), (2-dimethylamino)ethyl acrylate, (3-dimethylamino)propyl acrylate, the potassium salt of 3-sulfopropyl acrylate; methacrylic acid and its derivatives, such as methacrylic acid, methacrylic anhydride, methacrylamide, N,N-dimethylmethacrylamide, methacryl-onitrile, methyl methacrylate, ethyl methacrylate, vinyl methacrylate, propyl methacrylate, isopropyl methacrylate, butyl methacrylate, isobutyl methacrylate, tert-butyl methacrylate, hexyl methacrylate, cyclohexyl methacrylate, octyl methacrylate, 2-ethylhexyl methacrylate, dodecyl methacrylate, isododecyl methacrylate, octadecyl methacrylate, benzyl methacrylate and 2-hydroxyethyl methacrylate, hydroxypropyl methacrylate (isomer mixture), (2-dimethylamino)ethyl methacrylate, 2,3-epoxypropyl methacrylate, 2-(acetoacetoxy)ethyl methacrylate, the potassium salt of 3-sulfopropyl acrylate, 2-acrylamido-2-methylpropane-1-sulfonic acid (AMPS) and its salts; or styrene and its derivatives, such as methylstyrene, ethylstyrene, divinylbenzene. In addition, (meth)acrylates which have a double bond capable of free radical polymerization and are based on methoxypolyethylene glycol, (meth)acrylates which have two or more double bonds capable of free radical polymerization and are based on low molecular weight and/or high molecular weight polymeric polyols or vinyltriisopropoxysilane (CoatOSil® 1706, from Witco) and gamma-methacryloyoxypropyltriisopropoxysilane (CoatOSil® 1757 from Witco) can also be used. Vinyl halides, such as vinyl chloride, vinyl esters, such as vinyl acetate, 1,3-butadiene, isoprene and maleic anhydride and its derivatives are in principle also suitable. Acrylic acid and its derivatives and/or methacrylic acid and its derivatives and/or styrene and its derivatives are preferably used, but preferably combinations of from 5 to 95% by weight of methyl methacrylate and from 5 to 95% by weight of n-butyl acrylate or combinations of from 5 to 25% by weight of hydroxyalkyl esters of acrylic acid and/or methacrylic acid and from 75 to 95% by weight of further monomers having one or more double bonds capable of free radical polymerization.

The initiator component (G) consists of at least one lipophilic free radical initiator which has a half-life of one hour at a decomposition temperature in the range of from 40 to 120° C.

Suitable initiators are, for example, inorganic peroxides, such as ammonium peroxodisulfate, sodium peroxodisulfate, potassium peroxodisulfate, hydrogen peroxide, organic peroxides, such as percarbonates, diacyl peroxides, such as dibenzoyl peroxide, alkyl peroxides, such as tert-butyl hydroperoxide, cumyl hydroperoxide, dialkyl peroxides, such as di-tert-butyl peroxide, acyl alkyl peroxides, such as tert-butyl peroxybenzoate, azo initiators, such as 2,2'-azobis(2-methylbutyronitrile), 2,2'-azobis(2-methylpropio-nitrile) or 2,2'-azobisisobutyronitrile. Free radical initiators having one or more azo or peroxo groups, which have a half-life of one hour at a decomposition temperature of from 70 to 90° C., are preferably used. 2,2'-Azobisisobutyronitrile is particularly preferably used.

In the following reaction stage $b_2$), a free radical polymerization of the component (G) is carried out within the micelles of the polyurethane base dispersion by the thermal decomposition of the component (H). The reaction stage $b_2$) is preferably carried out at a temperature difference of ±10° C., based on the temperature at which the component (H) has a half-life of one hour. When 2,2'-azobisisobutyronitrile is used as component (H), the reaction stage $b_2$) is preferably carried out at a temperature of 80±10° C. The emulsion polymerization in the reaction stage $b_2$) is preferably carried out without further emulsifiers. After polymerization has finished, the prepared polyurethane-polymer hybrid dispersion is cooled and is filtered over a 100 μm sieve, and any hardened foam present is completely separated off thereby, according to a preferred embodiment.

The advantage of this preparation method is that monomers and initiators can be added together at room temperature and that no additional emulsifiers (surfactants) at all are necessary for their stabilization in the polyurethane base dispersion.

The monomers and the initiator are emulsified by the micelles of the polyurethane dispersion. In the free radical polymerization, an interpenetrating network of polyurethane resins and polymer resins, which are linked to one another by physical crosslinking, is formed within the micelles.

In the hybridization, the charge density or the number of carboxylate groups in the polyurethane-polymer hybrid [meq.100 g$^{-1}$] usually decreases considerably. The charge density of the micelles of the polyurethane base dispersion or of the anionically modified polyurethane polymers is in any case sufficiently large additionally to enable both the monomers and the polymers prepared from the monomers to be sufficiently stabilized. The storage stability of the polyurethane-polymer hybrid dispersions over a relatively long period is therefore ensured. In comparison with the films of the parent polyurethane base dispersions, the films of the polyurethane-polymer hybrid dispersions have substantially lower hydrophilicity and are accordingly less swellable by water.

The pure polymer comprising the components (G) and (H) in stage b$_2$) has a preferred glass transition temperature of from −50 to +100° C., in particular from −25 to +25° C. The calculation is carried out with the aid of the Fox equation.

The solids. content of a polyurethane-polymer hybrid consisting of the components (A) to (E), (G) and (H) is adjusted in particular to from 40 to 70% by weight, preferably from 50 to 60% by weight, based on the total amount of the pure polyurethane-polymer hybrid dispersion. The ratio of the proportionate solids contents of polyurethane resin comprising the components (A) to (E) and polymer resin comprising the components (G) and (H) is preferably adjusted to from 20:80 to 80:20% by weight, in particular from 40:60 to 60:40% by weight. The solids content of polyurethane-polymer hybrid consisting of the components (A) to (E), (G) and (H) is adjusted in particular to from 10 to 50% by weight, preferably from 20 to 40% by weight, and the solids content of formulation component (F) is adjusted in particular to from 10 to 70% by weight, preferably from 20 to 60% by weight, based on the total amount of the polyurethane-polymer hybrid dispersion formulated in situ or conventionally.

The content of carboxylate groups in the polyurethane-polymer hybrid comprising the components (A) to (E) is adjusted in particular to from 5 to 20 meq.(100 g)$^{-1}$, preferably from 10 to 15 meq.(100 g)$^{-1}$. The polyurethane polymer comprising the components (A) to (E) has a preferred acid number of from 2.5 to 12.5 meq KOH.g$^{-1}$, in particular from 5 to 10 20 meq KOH.g$^{-1}$.

The polyurethane-polymer hybrid has, as a rule, an average molecular mass of from 100000 to 500000 Dalton. The corresponding data relate to the number average $M_n$ and measurements with the aid of gel permeation chromatography (GPC).

The mean particle size of the micelles of the polyurethane-polymer hybrid is in particular from 50 to 500 nm, in particular from 100 to 400 nm. The corresponding data relate to measurements with the aid of photon correlation spectroscopy (PCS).

The Brookfield viscosity of the polyurethane-polymer hybrid dispersion is preferably less than 200 mPa.s, in particular less than 100 mPa.s (LV, 20° C., spindle 1, 60 rpm).

When applied in an amount of from 0.8 to 1.6 kg m$^{-2}$, the polyurethane-polymer hybrid dispersion comprising the components (A) to (E), (G) and (H) has a preferred water absorption of from 1 to 25% by weight of distilled water after drying for 2 days at 23° C. and 50% relative humidity and storage in water for 7 days at 23° C.

The preferred residual monomer content is less than 0.1% by weight, based on the total amount of the polyurethane-polymer hybrid dispersion. The corresponding data relate to measurements with the aid of gas chromatography (GC headspace).

The material properties of the films produced from the polyurethane base dispersions are excellent. The ideally linearly segmented structure of the polyurethane polymers results in a very pronounced and regular intermolecular domain structure of hard segments and soft segments. Hard segments consist of structural elements comprising rigid urethane and urea groups which have a strong interchenary interaction. Soft segments consist of flexible structural elements comprising carbonate, ester and ether groups which have a weak interchenary interaction. As a result of its preparation process, the polyurethane base dispersion has an ideally linearly segmented structure. Here, the expression "ideally linearly segmented structure" indicates that the polyurethane polymer has a linear structure and contains all structural components in regular sequence, from which the particular material properties of the polyurethane base dispersion result. The excellent material properties of the polyurethane base dispersions are transferred to the polyurethane-polymer hybrid dispersions when the process is carried out suitably. Depending on the choice of the polyurethane base dispersions and of the monomer component, elongation and tensile strength can be varied virtually as desired over wide ranges. Owing to the low charge density, the hydrophilicity of the unformulated and formulated polyurethane-polymer hybrid dispersion is reduced to a minimum. It is precisely in applications involving construction chemistry that binders which have high resilience and, in the formulated state, do not tend to embrittlement and can withstand continuous exposure to water are required.

The process which is used according to the invention and is referred to as High Solids Zero VOC Process is a universal method for the preparation of tailor-made polyurethane base dispersions and polyurethane-polymer hybrid dispersions. The low technical requirements of the process and the complete omission of volatile and/or nonvolatile organic solvents permit high space/time yields in combination with low costs. The performance of the polyurethane-polymer hybrid dispersions according to the invention with regard to the freedom from solvents, solids content, material properties and water resistance is remarkable. Moreover, the reproducibility of the process and the storage stability of the products should be singled out.

In the case of the polyurethane-polymer hybrid dispersions formulated in situ or conventionally, extremely high solids contents in combination with comparatively low viscosities are achieved. The formulation can be completely or partly integrated into the process for the preparation of the polyurethane base dispersion or can be carried out completely or partly after preparation of the polyurethane-polymer hybrid dispersion is complete.

The polyurethane-polymer hybrid dispersions according to the invention are distinguished by complete freedom from solvents, extremely high solids contents in combination with comparatively low viscosities, excellent material properties (such as, for example, elongation, tensile strength) and a technically simple preparation process.

The solvent-free polyurethane-polymer hybrid dispersion according to the invention is less complicated in terms of process engineering than the products known from the prior art, has a much less complicated composition and is thus an economical binder for applications involving construction chemistry, which surpasses commercially available products in its performance and its material properties.

The present invention furthermore relates to the use of solvent-free polyurethane-polymer hybrid dispersions in formulations for sport floor coverings.

The aqueous polyurethane-polymer hybrid dispersions proposed according to the invention are suitable as binders in the preparation of formulations for sport floor coverings, in particular in the following applications:

a) As binders for resilient layers consisting of rubber granules or fibers, which are produced in particular from SBR, EPDM, EVA or recycled granules having a particle size of from 0.5 to 50 mm or from fibers having a length of from 0.1 to 50 mm. If required, these resilient layers may also contain mineral additives having a particle size of from 1 to 20 mm.

b) As adhesion promoters or primers on the substrates (such as, for example, asphalt, cement-bound substrates, wood or wood floor toppings) of sport floor coverings.

c) For spray coatings on resilient (e.g. mats comprising rubber granules) or rigid substrates (e.g. asphalt) which, if required, may also contain from 5 to 80% by weight of structural fillers (such as, for example, SBR, EPDM or PVC granules, PU chips).

d) As leveling coatings on resilient (e.g. mats comprising rubber granules) or rigid substrates (asphalt or concrete) where the application may be effected in one or more layers and, if required, with sprinkled granules (in particular EPDM granules, from 1 to 4 mm).

e) As filling compounds for sealing the pores of substrates (for example prefabricated or locally installed coverings comprising rubber granules) of sport floor coverings for the subsequent application of a leveling coating or for the construction of water-impermeable structural spray coatings.

f) As adhesives for the adhesive bonding of prefabricated resilient layers (for example prefabricated mats comprising rubber granules) on asphalt or cement-bound substrates of sport floor coverings.

g) For sealing (if required in pigmented form) of sport floor coverings for increasing the wear resistance, weathering resistance, hue stability or resistance to chemicals or for establishing gloss and nonslip properties.

By using UV stabilizers of the sterically hindered amine type in concentrations from 0.1 to 1.0% by weight, based on the total mass of the formulation, the chalking resistance and continuous water resistance (warm water at about 50° C.) of formulations based on polyurethane-polymer hybrid dispersions can be substantially increased. It was possible to demonstrate this clearly in an apparatus specially designed for this purpose, in an extreme climate (intensive UV radiation, high temperature, simultaneous sprinkling with water). A clear improvement could be achieved also in the case of conventional (isocyanate-containing) coatings protected in the same manner.

The UV stabilizers used are systems of the HALS type (hindered amine light stabilizer), such as, for example, 1,2,2,6,6-pentamethyl-4-piperidinyl ester of decanedioic acid (HALS I) or 2,2,6,6-tetramethyl-1-isooctyloxy-4-piperidinyl ester of decanedioic acid (HALS II). HALS I types are preferably used. In combination with UV stabilizers of the HALS type, UV absorbers, such as, for example, substituted hydroxyphenylbenzotriazoles, hydroxybenzophenones or hydroxyphenyl-s-triazines, and antioxidants, such as, for example, substituted 2,6-di-tert-butylphenols, can also be used.

The polyurethane-polymer hybrid dispersions formulated according to the invention can be applied here to the resilient or rigid substrates in layers having a total thickness of from 0.1 to 50 mm, depending on the application. As a rule, from 0.1 to 10.0 kg of the formulated polyurethane-polymer hybrid dispersion per $m^2$ of the surface to be coated and per operation are required for this purpose.

Although the polyurethane-polymer hybrid dispersion formulated according to the invention can be used in one-component or two-component form, the one-component form is to be regarded as being preferable, owing to the better handling properties. In the case of a two-component application, the solvent-free polyurethane-polymer hybrid dispersions formulated according to the invention are used as the binder component and water-emulsifiable polyisocyanates as the curing component.

In addition, it is also possible in principle for the formulations according to the invention and based on polyurethane-polymer hybrid dispersions to be combined with formulations based on solvent-free polyurethane dispersions, polymer dispersions, redispersible polymer powders or nonaqueous polymers. Such solvent-free polyurethane dispersions are described in German Patent Application DE 198 12 751.0. Formulations based on these solvent-free polyurethane dispersions are described in the German Patent Application DE 198 33 819.8.

In addition to its improved processability and the very good environmental compatibility, the polyurethane-polymer hybrid dispersions proposed according to the invention also permit the following advantageous product properties with regard to the corresponding sport floor coverings:

Mechanical properties (tensile strength, elongation) of product films are unexpectedly at least the same as and in general even substantially better than in the case of isocyanate-containing systems.

All systems which show very good UV and color stability, so that a seal can be dispensed with in the case of colored resilient coats without an overcoat. Commercial, conventional systems have substantially reduced UV and weathering stability.

During the application, greater coat thicknesses can be applied than in the case of isocyanate-containing systems curing in the presence of atmospheric humidity.

The viscosity has a smaller temperature dependence than in the case of conventional systems.

The hydrolysis stability is also unexpectedly high without postcrosslinking.

There is unlimited adhesion within the individual coats of the abovementioned systems.

Compared with conventional systems, higher color brilliance in combination with less tendency to chalking is observed.

The formulations for adhesion promoters, leveling coating, spraying coating, binders, adhesive and filling materials were processed outdoors. Shelf-life, UV stability, intercoat adhesion, water resistance, weathering stability, etc. could be assessed under real conditions. The results obtained in the laboratory were confirmed.

In structural spray coating, the drying of a spray operation (about 2–6 h, depending on conditions) takes place significantly more rapidly than in the case of commercial solvent- and isocyanate-containing structural spray coatings (~24 h). They have the consequence that surfaces of a suitable size can be coated in one day in two spray operations without problems. For the processer, this means an enormous time saving, resulting in cheaper installation. This is of great importance particularly for small areas (<2000 m$^2$)

The extremely good mechanical properties of the coatings based on polyurethane-polymer hybrid dispersions also permit the design of novel systems having substantially smaller coat thicknesses for outdoor and indoor sports.

The polyurethane-polymer hybrid dispersions according to the invention can also be used in the construction sector as one-component, isocyanate-free and solvent-free binder or ready-made products. These applications involving construction chemistry include coatings, sealants, adhesives, finishes or membranes for the surfaces of mineral building materials, such as concrete, gypsum, cement and glass, wood, paper, metal or plastic. The polyurethane dispersions according to the invention are applied by the methods known from coating technology, such as, for example, flooding, pouring, knife-coating, spraying, brushing, dipping or rolling.

The examples which follow are intended to illustrate the invention in more detail.

PREPARATION EXAMPLES A

Example A.1
Solvent-free Polyurethane Base Dispersion (Basis: Polypropylene Glycol Having a Molecular Mass of 2000 Dalton)

A mixture of 100.00 g of a polypropylene glycol having a hydroxyl number of 56.1 mg KOH.g$^{-1}$ (trade name Acclaim® 2200 from Arco Chemical, low monol type) and 35.49 g of isophorone diisocyanate (trade name Vestanat IPDI from Degussa-Huls) is stirred while blanketing with nitrogen for 2 h at 80–90° C. in the presence of 0.1 g of dibutyltin dilaurate (DBTL) as a catalyst in a four-necked flask equipped with a KPG stirrer, reflux condenser, thermometer and nitrogen blanketing means. After the addition of 4.00 g of finely milled dimethylolpropionic acid (trade name DMPA® from Mallinckrodt) to the preadduct, the mixture is further stirred with blanketing with nitrogen at 80–90° C. until the calculated NCO content is reached (theory: 4.81% by weight, NCO/OH=2.00). The course of the reaction is monitored acidimetrically.

After cooling to 60° C., the prepolymer is directly neutralized with 2.72 g (90 equivalent %) of triethylamine. 142.21 g of the prepolymer were then dispersed in 146.04 g of water with vigorous stirring and then subjected to chain extension with 3.83 g (80 equivalent %) of ethylenediamine for producing the polyurethane dispersion. A stable polyurethane dispersion having the following characteristics is obtained:

| Appearance | milky white liquid |
|---|---|
| Solids content | about 50% by weight |
| pH | 7.5 |
| Brookfield viscosity | 172 mPa · s (20° C.) |
| Mean particle size | 309 nm |
| Charge density | 18.4 meq · (100 g)$^{-1}$ |

Example A.2
Solvent-free Polyurethane-polymer Hybrid Dispersion (n-Butyl acrylate:methyl methacrylate=70:30, T$_g$=−22° C.)

292.08 g of the solvent-free polyurethane base dispersion from example A.1 are initially introduced into a double-jacketed vessel equipped with a thermostat, stirrer, reflux condenser and internal thermometer and are diluted with 146.04 g of water. A mixture of 101.09 g of n-butyl acrylate, 43.33 g of methyl methacrylate and 1.62 g of 2,2'-azobisisobutyronitrile (molar initiator/monomer ratio 0.00808) is prepared in a separate vessel and is added to the diluted polyurethane base dispersion in the course of 1 h with the aid of a metering pump. The reaction mixture is then slowly heated to from 50 to 60° C.; after initiation of the polymerization reaction, stirring is continued for a further 5 h at from 80 to 90° C. A stable polyurethane-polymer hybrid dispersion having the following characteristics is obtained:

| Appearance | milky white liquid |
|---|---|
| Solids content | about 50% by weight |
| pH | 7.5 |
| Brookfield viscosity | 98.5 mPa · s (20° C.) |
| Mean particle size | 204 nm |
| Charge density | 9.2 meq · (100 g)$^{-1}$ |

Example A.3

Solvent-free Polyurethane-polymer Hybrid Dispersion (n-Butyl acrylate:methyl methacrylate=65:35, T$_g$=−16° C.)

The procedure is analogous to example A.2. 93.87 g of n-butyl acrylate, 50.55 g of methyl methacrylate and 1.62 g of 2,2'-azobisisobutyronitrile (molar initiator/monomer ratio 0.00798) are used.

A stable polyurethane-polymer hybrid dispersion having the following characteristics is obtained:

| Appearance | milky white liquid |
|---|---|
| Solids content | about 50% by weight |
| pH | 7.5 |
| Brookfield viscosity | 103.0 mPa · s (20° C.). |
| Mean particle size | 204 nm |
| Charge density | 9.2 meq · (100 g)$^{-1}$ |

Example A.4

Solvent-free Polyurethane-polymer Hybrid Dispersion (n-Butyl acrylate:methyl methacrylate=60:40, T$_g$=−10° C.)

The procedure is analogous to example A.2. 86.65 g of n-butyl acrylate, 57.77 g of methyl methacrylate and 1.62 g of 2,2'-azobisisobutyronitrile (molar initiator/monomer ratio 0.00788) are used.

A stable polyurethane-polymer hybrid dispersion having the following characteristics is obtained:

| Appearance | milky white liquid |
|---|---|
| Solids content | about 50% by weight |
| pH | 7.5 |
| Brookfield viscosity | 103.5 mPa · s (20° C.) |
| Mean particle size | 191 nm |
| Charge density | 9.2 meq · (100 g)$^{-1}$ |

TABLE 1

Material properties of solvent-free polyurethane-polymer hybrid dispersions

| Example | A.1 PUD | A.2 PUPHD | A.3 PUPHD | A.5 PUPHD |
|---|---|---|---|---|
| Stress at 100% elongation $\sigma_{100}$ | 2.09 MPa | 1.11 MPa | 1.66 MPa | 2.13 MPa |
| Stress at 300% elongation $\sigma_{300}$ | 3.95 MPa | 2.05 MPa | 3.30 MPa | 4.36 MPa |
| Stress at 500% elongation $\sigma_{500}$ | 6.95 MPa | 3.16 MPa | 5.83 MPa | 6.20 MPa |
| Tensile strength $\sigma_M$ | 24.84 MPa | 6.26 MPa | 10.58 MPa | 13.30 MPa |
| Elongation at the tensile strength $\epsilon_M$ | 862% | 790% | 681% | 643% |
| Water absorption | about 27% by weight | about 19% by weight | about 19% by weight | about 19% by weight |

PUD = Solvent-free polyurethane base dispersion
PUPHD = Solvent-free polyurethane-polymer hybrid dispersion
Material test according to DIN EN-ISO 527-3: 500 μm wet film thickness; drying for 7 days under standard climatic conditions
Water absorption (own method): Amount applied 0.8 kg m$^{-2}$, drying for 2 days under standard climatic conditions and storage in water at 23° C. for 7 days
Standard climatic conditions: 23° C., 50% relative humidity

Example A.5
Solvent-free Polyurethane Base Dispersion (Basis: Polypropylene Glycol Having a Molar Mass of 3000 Dalton)

A mixture of 100.00 g of a polypropylene glycol having a hydroxyl number of 56.1 mg KOH.g$^{-1}$ (trade name Voranol® P2000 from Dow Chemical) and 26.75 g of isophorone diisocyanate (trade name Vestanat IPDI from Degussa-Hüls) is stirred while blanketing with nitrogen for 2 h at from 80 to 90° C. in the presence of 0.1 g of dibutyltin dilaurate (DBTL) as a catalyst in a four-necked flask equipped with a KPG stirrer, reflux condenser, a thermometer and nitrogen blanketing means. After the addition of 3.60 g of finely milled dimethylolpropionic acid (trade name DMPA® from Mallinckrodt) to the preadduct, the mixture is further stirred while blanketing with nitrogen at 80–90° C. until the calculated NCO content is reached (theory: 3.88% by weight, NCO/OH=2.00). The course of the reaction is monitored acidimetrically.

After cooling to 60° C., the prepolymer is directly neutralized with 2.44 g (90 equivalent %) of triethylamine. 132.79 g of the prepolymer are then dispersed in 135.68 g of water with vigorous stirring and then subjected to chain extension with 2.89 g (80 equivalent %) of ethylenediamine to produce the polyurethane dispersion.

A stable polyurethane base dispersion having the following characteristics is obtained:

| | |
|---|---|
| Appearance | milky white liquid |
| Solids content | about 50% by weight |
| pH | 7.5 |
| Brookfield viscosity | 254 mPa · s (20° C.) |
| Mean particle size | 345 nm |
| Charge density | 17.8 meq · (100 g)$^{-1}$ |

Example A.6
Solvent-free Polyurethane Base Dispersion (n-Butyl acrylate:methyl methacrylate=70:30, $T_g$=−22° C.)

The procedure is analogous to example A.2. 271.36 g of the polyurethane base dispersion from example A.5, 135.68 g of water, 93.92 g of n-butyl acrylate, 40.25 g of methyl methacrylate and 1.51 g of 2,2'-azobisisobutyronitrile (molar initiator/monomer ratio 0.00808) are used.

A stable polyurethane-polymer hybrid dispersion having the following characteristics is obtained:

| | |
|---|---|
| Appearance | milky white liquid |
| Solids content | about 50% by weight |
| pH | 7.5 |
| Brookfield viscosity | 105.5 mPa · s (20° C.) |
| Mean particle size | 217 nm |
| Charge density | 8.9 meq · (100 g)$^{-1}$ |

Example A.7
Solvent-free Polyurethane Base Dispersion (n-Butyl acrylate:methyl methacrylate=65:35, $T_g$=−16° C.)

The procedure is analogous to example A.2. 271.36 g of the polyurethane base dispersion from example A.5, 135.68 g of water, 87.21 g of n-butyl acrylate, 46.96 g of methyl methacrylate and 1.51 g of 2,2'-azobisisobutyronitrile (molar initiator/monomer ratio 0.00798) are used.

A stable polyurethane-polymer hybrid dispersion having the following characteristics is obtained:

| | |
|---|---|
| Appearance | milky white liquid |
| Solids content | about 50% by weight |
| pH | 7.5 |
| Brookfield viscosity | 142.0 mPa · s (20° C.) |
| Mean particle size | 297 nm |
| Charge density | 8.9 meq · (100 g)$^{-1}$ |

Example A.8
Solvent-free Polyurethane Base Dispersion (n-Butyl acrylate: methyl methacrylate=60:40, $T_g$=−10° C.)

The procedure is analogous to example A.2. 271.36 g of the polyurethane base dispersion from example A.5, 135.68 g of water, 80.50 g of n-butyl acrylate, 53.67 g of methyl methacrylate and 1.51 g of 2,2'-azobisisobutyronitrile (molar initiator/monomer ratio 0.00788) are used.

A stable polyurethane-polymer hybrid dispersion having the following characteristics is obtained:

| | |
|---|---|
| Appearance | milky white liquid |
| Solids content | about 50% by weight |
| pH | 7.5 |
| Brookfield viscosity | 143.5 mPa · s (20° C.) |
| Mean particle size | 298 nm |
| Charge density | 8.9 meq · (100 g)$^{-1}$ |

TABLE 2

Material properties of solvent-free polyurethane-polymer hybrid dispersions

| Example | A.5 PUD | A.6 PUPHD | A.7 PUPHD | A.8 PUPHD |
|---|---|---|---|---|
| Stress at 100% elongation $\sigma_{100}$ | 1.17 MPa | 0.49 MPa | 0.78 MPa | 0.76 MPa |
| Stress at 300% elongation $\sigma_{300}$ | 2.52 MPa | 1.14 MPa | 1.79 MPa | 1.80 MPa |
| Stress at 500% elongation $\sigma_{500}$ | 3.84 MPa | 1.80 MPa | 3.43 MPa | 3.03 MPa |

TABLE 2-continued

Material properties of solvent-free polyurethane-polymer hybrid dispersions

| Example | A.5 PUD | A.6 PUPHD | A.7 PUPHD | A.8 PUPHD |
|---|---|---|---|---|
| Tensile strength $\sigma_M$ | 12.69 MPa | 5.88 MPa | 8.72 MPa | 7.55 MPa |
| Elongation at the tensile strength $\epsilon_M$ | 1183% | 1123% | 960% | 735% |
| Water absorption | about 30% by weight | about 20% by weight | about 20% by weight | about 20% by weight |

PUD = Solvent-free polyurethane base dispersion
PUPHD = Solvent-free polyurethane-polymer hybrid dispersion
Material test according to DIN EN-ISO 527-3: 500 μm wet film thickness; drying for 7 days under standard climatic conditions
Water absorption (own method): Amount applied 0.8 kg m$^{-2}$, drying for 2 days under standard climatic conditions and storage in water at 23° C. for 7 days
Standard climatic conditions: 23° C., 50% relative humidity

FORMULATION EXAMPLES B.1 to B.10

The percentage data are based in each case on % by weight

PUPHD=Solvent-free polyurethane-polymer hybrid dispersion
PUD=Solvent-free polyurethane base dispersion

Example B.1
Binder for Resilient Coats (1) 98.2% of PUPHD from example A.4
(2) 0.5% of deaerating composition (mixture of foam-destroying polysiloxanes)
(3) 1.0% of wetting agent (silicone surfactant)
(4) 0.3% of polyurethane thickener The liquid components (1) to (3) are initially introduced and are homogenized for 5 min at a low shear rate. After the addition of (4), dispersion is effected until the final viscosity is reached. During this, the temperature of the formulation may not exceed 40° C.

| Tensile strength | 13.0 MPa |
|---|---|
| Elongation at break | 575% |

Example B.2
Adhesion Promoter (1) 97.00% of PUPHD from example A.4
(2) 3.00% of wetting and dispersing additive (block polymer having groups with affinity to pigment)

| Tensile strength | 12.5 MPa |
|---|---|
| Elongation at break | 550% |

Example B.3
Spray Coating/Leveling Coating (Variant 1)

(1) 69.80% of PUPHD from example A.2
(2) 0.40% of deaerating composition (mixture of foam-destroying polysiloxanes)
(3) 0.80% of wetting and dispersing additive (block polymer having groups with affinity to pigment)
(4) 0.20% of leveling additive (modified organopolysiloxanes)
(5) 0.30% of UV absorber (HALS type)
(6) 0.30% of additive for improving the substrate wetting (silicone surfactant)
(7) 13.10% of calcium carbonate
(8) 13.00% of mica
(9) 2.00% of pigment (e.g. iron oxide red)
(10) 0.10% of polyurethane thickener The liquid components (1) to (6) are initially introduced and are homogenized for 5 min at a low shear rate. Thereafter, (7), (8) and (9) are added and are dispersed for 10 min at a high shear rate. After the addition of (10), dispersing is effected until the final viscosity is reached. During this, the temperature of the formulation may not exceed 400° C.

| Tensile strength | 4.3 MPa |
|---|---|
| Elongation at break | 730% |
| Tear propagation strength | 14.2 N/mm |

Example B.4
Spray Coating/Leveling Coating (Variant 2)

The procedure is analogous to example B.3. The PUPHD from example A.3 is used

| Tensile strength | 5.2 MPa |
|---|---|
| Elongation at break | 660% |
| Tear propagation strength | 16.1 N/mm |

Example B.5
Spray Coating/Leveling Coating (Variant 3)

The procedure is analogous to example B.3. The PUPHD from example A.4 is used

| Tensile strength | 5.6 MPa |
|---|---|
| Elongation at break | 580% |
| Tear propagation strength | 20.5 N/mm |

Example B.6
Filling Compound (Variant 1)

(1) 48.58% of PUPHD from example A.2
(2) 0.40% of deaerating composition (mixture of foam-destroying polysiloxanes)
(3) 0.80% of wetting and dispersing additives (block polymer having groups with affinity to pigment)
(4) 0.20% of additive for improving the substrate wetting (silicone surfactant)
(5) 35.90% of calcium carbonate
(6) 2.00% of pigment (e.g. iron oxide red)
(7) 12.00% of kaolin
(8) 0.12% of polyurethane thickener The liquid components (1) to (4) are initially introduced and are homogenized for 5 min at a low shear rate. Thereafter, (5), (6) and (7) are added and are dispersed for 10 min at a high shear rate. After the addition of (8), dispersing is effected until the final viscosity is reached.

During this, the temperature of the formulation may not exceed 40° C.

| | |
|---|---|
| Tensile strength | 5.9 MPa |
| Elongation at break | 151% |
| Tear propagation strength | 18.0 N/mm |

Example B.7
Filling Compound (Variant 2)

The, procedure is analogous to example B.6. The PUPHD from example A.3 is used

| | |
|---|---|
| Tensile strength | 6.2 MPa |
| Elongation at break | 129% |
| Tear propagation strength | 16.6 N/mm |

Example B.8
Filling Compound (Variant 3)

The procedure is analogous to example B.6. The PUPHD from example A.4 is used

| | |
|---|---|
| Tensile strength | 7.1 MPa |
| Elongation at break | 130% |
| Tear propagation strength | 16.5 N/mm |

Example B.9
Adhesive (1) 60.00% of PUPHD from example A.4
(2) 0.50% of wetting and dispersing additive (block polymer having groups with affinity to pigment)
(3) 0.50% of deaerating composition (mixture of foam-destroying polysiloxanes)
(4) 38.90% of barite
(5) 0.10% of polyurethane thickener The liquid components (1) to (3) are initially introduced and are homogenized for 5 min at a low shear rate. Thereafter, (4) is added and is dispersed for 10 min at a high shear rate. After the addition of (5), dispersing is effected until the final viscosity is reached. During this, the temperature of the formulation may not exceed 40° C.

| | |
|---|---|
| Tensile strength | 5.0 MPa |
| Elongation at break | 300% |

Example B.10
Structural Spray Coating Based on a Polyurethane Dispersion (1) 71.5% of PUD from Example A.1
(2) 0.6% of wetting agent (silicone surfactant)
(3) 0.5% of dispersing additive (copolymer having groups with affinity to pigment)
(4) 0.3% of deaerating composition (mixture of foam-destroying polysiloxanes)
(5) 24.0% filler (calcium carbonate)
(6) 2.0% pigment (iron oxides)
(7) 1.0% of pyrogenic silica
(8) 0.1% of polyurethane thickener The liquid components (1) to (4) are initially introduced and are homogenized for 5 min at a low shear rate. Thereafter, (5), (6) and (7) are added and are dispersed for 10 min at a high shear rate. After the addition of (8), dispersing is effected until the final viscosity is reached. During this, the temperature of the formulation may not exceed 40° C.

| | |
|---|---|
| Tensile strength | 16.0 MPa |
| Elongation at break | 300% |
| Tear propagation strength | 25.0 N/mm |

COMPARATIVE EXAMPLES V.1 to V.4

Example V.1

Typical values of a conventional 1-component binder (Conipur 322, from Conica Technik AG):

| | |
|---|---|
| Tensile strength | 15 MPa |
| Elongation at break | 400% |
| Viscosity (20° C.) | 4 000 mPa · s |

Example V.2

Typical values of a conventional 1-component (Conipur 217, from Conica Technik AG) or 2-component spray coating (Conipur 216, from Conica Technik AG,):

| | |
|---|---|
| Tensile strength | 8 MPa |
| Elongation at break | 400% |
| Viscosity (20° C.) | 1 000 mPa · s |

Example V.3

Typical values of a conventional 2-component leveling coating (Conipur 210, from Conica Technik AG):

| | |
|---|---|
| Tensile strength | 2 MPa |
| Elongation at break | 150% |
| Viscosity (20° C.) | 3 600 mPa · s |

Example V.4

Typical values of a conventional 2-component filling material (Conipur 203, from Conica Technik AG):

| | |
|---|---|
| Tensile strength | 3.5 MPa |
| Elongation at break | 80% |
| Viscosity (20° C.) | thixotropic |

USE EXAMPLES C.1 to C.8

PUPHD=Solvent-free polyurethane-polymer hybrid dispersion
PUD=Solvent-free polyurethane base dispersion

Example C.1
Use as Adhesion Promoter and Binder for Resilient Coats
- 10 mm of water-permeable covering comprising EPDM granules
- Substrate: asphalt or concrete
- 0.2 kg/m² of PUPHD-based adhesion promoter according to example B.2
- 9.5 kg/m² of EPDM granules, from 1 to 4 mm
- 3.2 kg/m² of PUPHD-based binder according to example B.1

After drying of the adhesion promoter applied by rolling or spraying, a mixture of EPDM granules and binder is compacted to give a covering comprising granules.

Example C.2
Use As Spray Coating
- 13 mm of water-permeable structural spray coating on floor comprising rubber granules
- Substrate: asphalt or concrete
- 0.2 kg/m² of adhesion promoter (conventional), e.g. Conipur 70
- 6.9 kg/m² of SBR granules, from 1 to 4 mm
- 1.5 kg/m² of polyurethane binder (conventional), e.g. Conipur 322
- 1.2 kg/m² of PUPHD-based spray coating according to example B.3
- 0.8 kg/m² of EPDM granules, from 0.5 to 1.5 mm A mixture of spray coating and EPDM granules having a small particle size is sprayed in two operations onto an installed floor comprising rubber granules and suitable for walking on.

Example C.3
Use As Spray Coating
- 13 mm water-impermeable structural spray coating on floor comprising rubber granules
- Substrate: asphalt or concrete
- 0.2 kg/m² of adhesion promoter (conventional), e.g. Conipur 70
- 6.9 kg/m² of SBR granules, from 1 to 4 mm
- 1.5 kg/m² of polyurethane binder (conventional), e.g. Conipur 322
- 1.5 kg/m² of filling material (conventional), e.g. Conipur 203
- 1.2 kg/m² of PUPHD-based spray coating according to example B.4
- 0.8 kg/m² of EPDM granules, from 0.5 to 1.5 mm In order to obtain a water-impermeable sport floor covering, the pores of a floor comprising rubber granules are closed by means of a filling material before application of the spray coating.

Example C.4
Use As Filling Material and Spray Coating
- 13 mm water-impermeable structural spray coating on floor comprising rubber granules
- Substrate: asphalt or concrete
- 0.2 kg/m² of adhesion promoter (conventional), e.g. Conipur 70
- 6.9 kg/m² of SBR granules, from 1 to 4 mm
- 1.5 kg/m² of polyurethane binder (conventional), e.g. Conipur 322
- 1.5. kg/m² of PUPHD-based filling material according to B.6
- 1.2 kg/m² of PUPHD-based spray coating according to example B.5
- 0.8 kg/m² of EPDM granules, from 0.5 to 1.5 mm

Example C.5
Use As Leveling Coating
- 13 mm water-impermeable leveling coating on floor comprising rubber granules
- Substrate: asphalt or concrete
- 0.2 kg/m² of adhesion promoter (conventional), e.g. Conipur 70
- 6.5 kg/m² of SBR granules, from 1 to 4 mm
- 1.4 kg/m² of polyurethane binder (conventional), e.g. Conipur 322
- 1.5 kg/m² of filling material (conventional), e.g. Conipur 203
- 2.5 kg/m² of PUPHD-based leveling coating according to example B.3
- 2.5 kg/m² of EPDM granules, from 1 to 4 mm In order to seal pores, a filling material is applied to an installed floor comprising rubber granules and suitable for walking on. Hardening is followed by application of a leveling coating which is sprinkled, while still in liquid state, with an excess of EPDM granules. That amount of EPDM granules which is not bound is swept away after the coating has completely hardened and can be reused.

Example C.6
Use As Leveling Coating
- From 4 to 5 mm water-impermeable, sealed solid coating
- Substrate: asphalt
- 3×2.0 kg/m² of PUPHD-based leveling coating according to example B.4
- 0.3 kg/m² of polyurethane seal (smooth or nonslip), e.g. Conipur 63 HE, Conipur 64 HE The leveling coating is applied in three operations and, after complete hardening, is sealed in two spray operations.

Example C.7
Use As Adhesive, Filling Compound and Leveling Coating
- 13 mm water-impermeable leveling coating on prefabricated floor comprising rubber granules
- Substrate: asphalt or concrete
- 0.2 kg/m² of adhesion promoter (conventional), e.g. Conipur 70
- 1.0 kg/m² of PUPHD-based adhesive according to example B.9
- Prefabricated mat comprising rubber granules, 10 mm
- 0.5 kg/m² of PUPHD-based filling material according to example B.7
- 2.5 kg/m² of PUPHD-based leveling coating according to example B.5
- 2.5 kg/m² of EPDM granules, from 1 to 4 mm After preparation of the substrate with an adhesion promoter, a prefabricated mat comprising rubber granules is adhesively bonded to said substrate, the pores are sealed with a filling material and the leveling coating is applied in the manner described above and are sprinkled with EPDM granules.

Example C.8

Use As Adhesion Promoter, Binder, Filling Material and Spray Coating 13 mm water-impermeable structural spray coating on a floor comprising rubber granules Substrate: asphalt or concrete 0.2 kg/m² of PUPHD-based adhesion promoter according to example B.2

6.9 kg/m² of SBR granules, from 1 to 4 mm 2.3 kg/m² of PUPHD-based binder according to example B.1

1.5 kg/m² of PUPHD-based filling material according to 1.2 kg/m² of Pud-based spray coating according to example B.10

0.8 kg/m² pf EPDM granules, from 0.5 to 1.5 mm.

What is claimed is:

1. A solvent-free polyurethane-polymer hybrid dispersion having a high solids content of polymer or formulation constituents, prepared by the process of
   a) preparing polyurethane base dispersion by
      $a_1$) reacting from 2 to 40% by weight of a relatively high molecular weight polyol component (A) (i) having two or more hydroxyl groups reactive toward polyisocyanates and a molecular mass of from 500 to 6,000 Dalton and, optionally from 0.1 to 2% by weight of low molecular weight polyol component (A) (ii) having two or more hydroxyl groups that react with polyisocyanates and a molecular mass of from 60 to 150 Dalton with from 2 to 20% by weight of a polyisocyanate component (B) comprising at least one polyisocyanate, polyisocyanate derivative or polyisocyanate homolog having two or more aliphatic or aromatic isocyanate groups, optionally in the presence of a catalyst,
      $a_2$) reacting the polyurethane preadduct from stage $a_1$), which has completely or partly reacted, with from 0.1 to 2% by weight of a low molecular weight and anionically modifiable polyol component (A) (iii) having a molecular mass of from 50 to 250 Dalton and two or more hydroxyl groups reactive toward polyisocyanates and one or more carboxyl groups inert toward polyisocyanates, which can be completely or partly converted into carboxylate groups in the presence of bases,
      $a_3$) reacting the polyurethane prepolymer from stage $a_2$) with from 0.1 to 1.5% by weight of a neutralizing component (C) for complete or partial neutralization of the carboxyl groups, subsequently or simultaneously
      $a_4$) dispersing the neutralized polyurethane prepolymer from stage $a_3$) in from 10 to 60% by weight of water which, if required, also contains from 0.1 to 70% by weight of a formulation component (F) consisting of fillers, pigments, plasticizers, fiber materials and/or other conventional additives for in situ formulation, and then
      $a_5$) reacting the polyurethane prepolymer dispersion from stage $a_4$) with from 0.1 to 2% by weight of a chain-extending component (D) consisting of at least one polyamine having one or more amino groups reactive toward polyisocyanates and, if required, from 0.05 to 1% by weight of a chain stopper component (E) consisting of at least one monoamine having an amino group reactive toward polyisocyanates, and
   b) subsequently preparing a polyurethane-polymer hybrid dispersion by
      $b_1$) mixing the polyurethane base dispersion from stage $a_5$) with a prepared mixture of from 3 to 60% by weight of a monomer component (G) consisting of one or more monomers having one or more double bonds capable of free radical polymerization and from 0.01 to 1% by weight of initiator component (H) consisting of at least one lipophilic free radical initiator which has a half-life of one hour at a decomposition temperature in the range of from 40 to 170° C., and finally
      $b_2$) carrying out a free radical polymerization of the component (G) within the micelles of the polyurethane base dispersing by the thermal decomposition of the component (H), the solids content of polyurethane polymer comprising components (A) to (E) being adjusted to from 40 to 70% by weight, based on the total amount of polyurethane base dispersion.

2. The polyurethane-polymer hybrid dispersion as claimed in claim 1, wherein the polyol component (A) (i) comprises at least one of a polyetherpolyol or a polyesterpolyol.

3. The polyurethane-polymer hybrid dispersion as claimed in claim 1, wherein component (A) (i) comprises polymeric polyols, such as polyalkylene glycols, aliphatic or aromatic polyesters, polycaprolactones, polycarbonates, macromonomers, telechelic substances or epoxy resins.

4. The polyurethane-polymer hybrid dispersion as claimed in claim 1, wherein linear or difunctional polypropylene glycols having a molecular mass of from 1,000 to 4,000 Dalton are used as component (A) (i).

5. The polyurethane-polymer hybrid dispersion as claimed in claim 1, wherein linear or difunctional aliphatic or aromatic polyesterpolyols having a molecular mass of from 1000 to 4000 Dalton are used as component (A) (i).

6. The polyurethane-polymer hybrid dispersion as claimed in claim 1, wherein component (A) (iii) has a molecular mass of from 100 to 200 Dalton.

7. The polyurethane-polymer hybrid dispersion as claimed in claim 1, wherein component (A) (iii) is a bishydroxyalkanecarboxylic acid.

8. The polyurethane-polymer hybrid dispersion as claimed in claim 7, wherein bishydroxyalkanecarboxylic acid is the dimethylolpropionic acid.

9. The polyurethane-polymer hybrid dispersion as claimed in claim 1, wherein NCO/OH equivalent ratio of components (A) (i), (A) (ii) and (B) in stage $a_1$) is adjusted to a value of from 2.5 to 5.0.

10. The polyurethane-polymer hybrid dispersion as claimed in claim 1, wherein NCO/OH equivalent ration of the polyurethane preadduct from stage $a_1$) and of component (B) in stage $a_2$) is adjusted to a value of from 2.5 to 5.0.

11. The polyurethane-polymer hybrid dispersion as claimed in claim 1, wherein NCO/OH equivalent ration of the total amount of the components (A) and (B) in the stages $a_1$) and $a_2$) is adjusted to a value of from 1.5 to 2.5, preferably from 1.8 to 2.2.

12. The polyurethane-polymer hybrid dispersion as claimed in claim 1, wherein the reaction stages $a_1$) and $a_2$) are carried out in the presence of from 0.01 to 1% by weight, based on the components (A) and (B), of a catalyst customary for polyaddition reactions with polyisocyanates.

13. The polyurethane-polymer hybrid dispersion as claimed in claim 1, wherein the polyurethane prepolymer comprises the components (A) and (B) from stage $a_2$) has an acid number of from 2.5 to 25 meq $KOH^{g-1}$.

14. The polyurethane-polymer hybrid dispersion as claimed in claim 1, wherein the reaction stages $a_1$) and $a_2$) are carried out at a temperature of from 60 to 120° C.

15. The polyurethane-polymer hybrid dispersion as claimed in claim 14, wherein the reaction stages $a_1$) and $a_2$) are carried out at a temperature of from 80 to 100° C.

16. The polyurethane-polymer hybrid dispersion as claimed in claim 1, wherein that tertiary amines, ammonia or alkali metal hydorxides are used as neutralizing component (C).

17. The polyurethane-polymer hybrid dispersion as claimed in claim 1, wherein that triethylamine is used as neutralizing component (C).

18. The polyurethane-polymer hybrid dispersion as claimed in claim 1, wherein the neutralizing component (C) is added in an amount such that the degree of neutralization is from 70 to 100 equivalent %, preferably from 80 to 90 equivalent %, based on the free carboxyl groups of the polyurethane prepolymer.

19. The polyurethane-polymer hybrid dispersion as claimed in claim 1, wherein the reaction stage $a_3$) is carried out at a temperature of from 40 to 60° C.

20. The polyurethane-polymer hybrid dispersion as claimed in claim 1, wherein the stages $a_3$) and $a_4$) were combined in a manner such that the neutralizing component (C) was added to the water in which the prepolymer is dispersed according to reaction stage $a_4$).

21. The polyurethane-polymer hybrid dispersion as claimed in claim 1, wherein the other customary additives in the component (F) is at least one of a dispersant, rheology auxiliary, antifoam agent, adhesion promoters antifreezes, flameproofing agent, antioxidant, UV stabilizer, bactericides, fungicide, preservative or additional polymers or polymer dispersions or redispersible polymer powders.

22. The polyurethane-polymer hybrid dispersion as claimed in claim 1, wherein the formulation component (F) is completely or partly introduced into the polyurethane prepolymer before the dispersing according to reaction stage $a_4$).

23. The polyurethane-polymer hybrid dispersion as claimed in claim 1, wherein in the case of conventional formulation, the formulation component (F) is completely or partly introduced into the prepared polyurethane-polymer hybrid dispersion only after the end of the reaction stage $b_2$).

24. The polyurethane-polymer hybrid dispersion as claimed in claim 1, wherein the reaction stage $a_4$) is carried out at from 30 to 50° C.

25. The polyurethane-polymer hybrid dispersion as claimed in claim 1, wherein the chain-extending component (D) is used in an amount such that the degree of chain extension is from 50 to 100 equivalent %, preferably from 70 to 80 equivalent %, based on the free isocyanate groups of the polyurethane prepolymer.

26. The polyurethane-polymer hybrid dispersion as claimed in claim 1, wherein the chain-extending component (D)) used is a difunctional primary amine.

27. The polyurethane-polymer hybrid dispersion as claimed in claim 1, wherein the difunctional primary amine used is ethylenediamine.

28. The polyurethane-polymer hybrid dispersion as claimed in claim 1, wherein the chain stopper component (E) is used in an amount such at the degree of chain stopping is from 1 to 20 equivalent %, preferably from 5 to 10 equivalent %, based on the free isocyanate groups of the polyurethane prepolymer.

29. The polyurethane-polymer hybrid dispersion as claimed in claim 1, wherein the chain stopper component (E) used is a monofunctional primary amine.

30. The polyurethane-polymer hybrid dispersion as claimed in claim 1, wherein the monofunctional primary amine used is isopropoylamine.

31. The polyurethane-polymer hybrid dispersion as claimed in claim 1, wherein the components (D) and (E) in the reaction stage $a_5$) are diluted in the weight ratio of from 1:1 to 1:10 in amounts of water removed beforehand.

32. The polyurethane-polymer hybrid dispersion as claimed in claim 1, wherein any free NCO groups still present after the reaction stage $a_5$) are all subjected to chain-extension with water.

33. The polyurethane-polymer hybrid dispersion as claimed in claim 1, wherein the reaction stage $a_5$) is carried out at from 30 to 50° C.

34. The polyurethane-polymer hybrid dispersion as claimed in claim 1, wherein the solids content of polyurethane polymer consisting of the components (A) to (E) is adjusted to from 50 to 60% by weight, based on the total amount of the polyurethane base dispersion.

35. The polyurethane-polymer hybrid dispersion as claimed in claim 1, wherein the solids content of polyurethane polymer consisting of the components (A) to (E) is adjusted to from 10 to 50% by weight, preferably from 20 to 40% by weight, and the solids content of the formulation component (F) is adjusted to from 10 to 70% by weight, preferably from 20 to 60% by weight, based on the total amount of the polyurethane base dispersion formulated in situ or conventionally.

36. The polyurethane-polymer hybrid dispersion as claimed in claim 1, wherein the content of cabroxylate groups in the polyurethane polymer comprising the components (A) to (E) is adjusted to from 10 to 40 meq $(100\ g)^{-1}$, preferably from 15 to 35 meg $(100\ g)^{-1}$.

37. The polyurethane-polymer hybrid dispersion as claimed in claim 1, wherein the polyurethane polymer comprising the components (A) to (E) has an acid number of from 5 to 25 mg $KOH^{-1}$, preferably from 7.5 to 22.5 mg KOH $g^{-1}$.

38. The polyurethane-polymer hybrid dispersion as claimed in claim 1, wherein polyurethane polymer comprising components (A) to (E) has an average molecular mass of from 25000 to 250000 Dalton.

39. The polyurethane-polymer hybrid dispersion as claimed in claim 1, wherein mean particle size of the micelles of the polyurethane polymer comprising components (A) to (E) is frorn from 100 to 500 nm, preferably from 200 to 400 nm.

40. The polyurethane-polymer hybrid dispersion as claimed in claim 1, wherein component (G) comprises acrylic acid and its derivatives and/or methacrylic acid and its derivatives and/or styrene and its derivatives.

41. The polyurethane-polymer hybrid dispersion as claimed in claim 1, wherein combinations of from 5 to 95% by weight of methyl methacrylate and from 5 to 95% by weight of n-butyl acrylate, based on the total amount of the component (G), are used as component (G).

42. The polyurethane-polymer hybrid dispersion as claimed in claim 1, wherein combinations of from 5 to 25% by weight of hydroxyalkyl esters of acrylic acid or methacrylic acid and from 75 to 95% by weight of further monomers having one or more double bonds capable of free radical polymerization are used as component (G).

43. The polyurethane-polymer hybrid dispersion as claimed in claim 1, wherein component (H) is a free radical initiator having one or more azo or peroxo groups.

44. The polyurethane-polymer hybrid dispersion as claimed in claim 1, wherein free radical initiator which has a half-life of one hour at a decomposition temperature in the range of from 40 to 1200° C. is used as component (H).

45. The polyurethane-polymer hybrid dispersion as claimed in claim 1, wherein component (H) is 2,2'-azobisisobutyronitrile.

46. The polyurethane-polymer hybrid dispersion as claimed in claim 1, wherein molar initiator/monomer ratio of the components (H) and (G) is adjusted in the range from 0.001 to 0.05.

47. The polyurethane-polymer hybrid dispersion as claimed in claim 1, wherein part of the water from stage $a_4$) is added only in stage $b_1$) for adjusting the solids content.

48. The polyurethane-polymer hybrid dispersion as claimed in claim 1, wherein reaction stage $b_1$) is carried out at a temperature of from 15 to 35° C. preferably from 20 to 30° C.

49. The polyurethane-polymer hybrid dispersion as claimed in claim 1, wherein reaction stage $b_2$) is carried out at a temperature difference of ±10° C., based on the temperature at which the component (H) has a half-life of one hour.

50. The polyurethane-polymer hybrid dispersion as claimed in claim 1, wherein reaction stage $b_2$) is carried out preferably at a temperature of 80±10° C., when using 2,2'-azobisisobutyronitrile as component (H).

51. The polyurethane-polymer hybrid dispersion as claimed in claim 1, wherein free radical polymerization in the reaction stage $b_2$) is carried out without further emulsifier.

52. The polyurethane-polymer hybrid dispersion as claimed in claim 1, wherein pure polymer comprising the components (G) and (H) in stage $b_2$) has a glass transition temperature of from −50 to +100° C., preferably from −25 to +25° c.

53. The polyurethane-polymer hybrid dispersion as claimed in claim 1, wherein solids content of polyurethane hybrid polymer consisting of the components (A) to (E), (G) and (H) is adjusted to from 40 to 70% by weight preferably from 50 to 60% by weight, based on the total amount of pure polyurethane-polymer hybrid dispersion.

54. The polyurethane-polymer hybrid dispersion as claimed in claim 1, wherein ratio of the proportionate solids contents of polyurethane resin comprising the components (A) to (E) and polymer resin comprising the components (G) and (H) is adjusted to from 20:80 to 80:20% by weight, preferably from 40:60 to 60:40% by weight.

55. The polyurethane-polymer hybrid dispersion as claimed in claim 1 wherein solids content of polyurethane-polymer hybrid consisting of the components (A) to (E), (G) an (H) is adjusted to from 10 to 50%, by weight, preferably from 20 to 40% by weight, and the solids content of fillers is adjusted to from 10 to 70% by weight, preferably from 20 to 60% by weight, based on the total amount of the polyurethane-polymer hybrid dispersion formulated in situ or conventionally.

56. The polyurethane-polymer hybrid dispersion as claimed in claim 1, wherein content of cabroxylate groups in the polyurethane-polymer hybrid comprising the components (A) to (E), (G) and (H) is adjusted to from 5 to 20 meq. (100 g) $g^{-1}$, preferably from 10 to 15 meq. (100 g)$^{-1}$.

57. The polyurethane-polymer hybrid dispersion as claimed in claim 1, wherein polyurethane-polymer hybrid comprising the components (A) to (E), (G) and (H) has an acid number of from 2.5 to 12.5 mg KOH $g^{-1}$, preferably from 5 to 10 mg KOHg$^{-1}$.

58. The polyurethane-polymer hybrid dispersion as claimed in claim 1, wherein mean particle size of the micelles of polyurethane-polymer hybrid is from 50 to 500 nm, preferably from 100 to 400 nm.

59. The polyurethane-polymer hybrid dispersion as claimed in claim 1, wherein polyurethane-polymer hybrid comprising the components (A) to (E), (G) and (H) has an average molecular mass of from 100,000 to 500,000 Dalton.

60. The polyurethane-polymer hybrid dispersion as claimed in claim 1, wherein when applied in an amount of from 0.8 to 1.6 kg m$^{-2}$, the polyurethane-polymer hybrid dispersion comprising the components (A) to (E), (G) and (H) has a water absorption of from 1 to 25% by weight of distilled water after drying for 2 days at 23° C. and 50% relative humidity and storage in water at 23° C. for 7 days.

* * * * *